(12) United States Patent
Menard et al.

(10) Patent No.: US 6,298,281 B1
(45) Date of Patent: Oct. 2, 2001

(54) ASSEMBLY LINE FOR MOUNTED UNITS

(75) Inventors: Bernard Menard, Guichen; Frederic Pature, Saint-Malo-de-Phily; Jacques Pitou, Ennery, all of (FR)

(73) Assignee: Compagnie Générale des Etablissements Michelin-Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/470,464

(22) Filed: Dec. 22, 1999

Related U.S. Application Data

(63) Continuation of application No. PCT/EP98/02551, filed on Apr. 30, 1998.

(30) Foreign Application Priority Data

Jun. 25, 1997 (FR) .................................................. 97 08077

(51) Int. Cl.$^7$ ...................................................... G06F 7/00
(52) U.S. Cl. .................. 700/228; 700/199; 700/266; 700/245; 700/280; 382/104; 340/441; 340/442; 340/444; 340/445; 340/447; 73/146
(58) Field of Search ................................... 700/245, 228, 700/280, 199, 266; 382/104; 340/442, 444, 447, 445, 441; 73/146

(56) References Cited

U.S. PATENT DOCUMENTS

| | | | |
|---|---|---|---|
| 4,504,919 | 3/1985 | Fujii et al. | 700/228 |
| 6,034,676 * | 3/2000 | Egan et al. | 345/326 |

OTHER PUBLICATIONS

Peshek et al., Advancwed Control System For Automatic Tire Building, IEEE., pp. 93–102, Sep. 1989.*
Blackwell et al., Machine Vision In The Tire Industry, 1989, IEEE, pp. 67–79.*

* cited by examiner

*Primary Examiner*—William A. Cuchlinski, Jr.
*Assistant Examiner*—McDieunel Marc
(74) *Attorney, Agent, or Firm*—Baker Botts L.L.P.

(57) ABSTRACT

An assembly line of mounted assemblies, each composed of a tire and a wheel, which includes mounting the tires on the wheels by use of a mounter, correcting the position of the tire heels and balancing the mounted assemblies, as well as of storing and/or picking up the mounted assemblies by use of mobile units in and/or from a storage warehouse, characterized in that the production and delivery of assemblies are information-managed by a system of dedicated computers and robots, so that the assemblies can be delivered in sync to at least one manufacturer having need for the assemblies on the manufacturer's vehicle assembly line.

2 Claims, 2 Drawing Sheets

ASSEMBLY LINE FOR MOUNTED UNITS

This is a continuation of PCT/EP 98/02551, filed Apr. 30, 1998.

BACKGROUND OF INVENTION

The invention concerns an assembly line for mounting tires on their mounting wheels, with a view to obtaining mounted assemblies ready to be delivered on time to customers, who are generally motor vehicle manufacturers. It concerns, in particular, the system of computerized management of production and delivery of mounted assemblies.

Such an assembly line L (FIG. 1) contains, in the manner known, for example, through U.S. Pat. No. 4,504,919, conveyor bands or belts or metal roller conveyors 1 making possible the routing of tires P, wheels R and mounted assemblies E from one point to another on the assembly line, said tires and said wheels coming from a supply warehouse 2 via appropriate means of transportation. Each wheel R and each tire P, after having been centered on their respective conveyor devices 1, are lubricated in lubricating stations $2_P$ and $2_R$ in order to facilitate, as known per se, mounting of the tire, which is carried out by means of a mounting machine or mounter 3, the two beads being set in place in the mounting groove by pressure arms and a roller. An inflating means 4, an inflating bell, for example, makes it possible to introduce inflating gas in the mounted assembly E. Said mounted assembly E, balanced on a balancing machine 7, is then conveyed on a conveyor belt 1 to a storage warehouse 8, comprising several chutes 80, whence it will be picked up by means of mobile units 81 in order to be placed in a means of delivery 9a, 9b to the vehicle manufacturers.

Said delivery is made at present in accordance with successive daily orders from the manufacturer or manufacturers; hence, the birth of assembly lines and so-called advanced storage warehouses, that is, close to the manufacturer's assembly line, so as to be able to deliver the mounted assembly E in sync with the vehicle production unit, that is, to deliver the mounted assembly intended for a given vehicle, so that the latter can be equipped at a given time, a time determined by the kinematics of the vehicle assembly line.

It is customary also to supply mounted assemblies simultaneously to several vehicle manufacturers, only one or more having to be delivered in sync from the same assembly line of mounted units. It is also common in any industrial process worthy of that name to anticipate risks of production stoppage, whatever the causes, and to provide accordingly for stocks of standby mounted assemblies, the problem being one of being able at any time to honor customers' orders within a given time frame.

SUMMARY OF THE INVENTION

To attain said objectives, in accordance with the invention, the line of production and delivery of mounted assemblies, each consisting of a tire and its service wheel, mainly comprising means of routing tires and wheels, means of assembly of the tires on their wheels, means of control and storage of mounted assemblies E, lines and units for delivery of said assemblies, is characterized in that, in order to deliver assemblies in sync to at least one vehicle manufacturer, it further comprises a computer system comprising:

a) one computer making it possible to create and memorize a file of orders from the manufacturer(s) (link a), b) a programmable robot for management of the automatic loading controls of the delivery units according to a memorized cartography, and querying c) a programmable robot for management of the storage means, controlling the entrance and placement of the assemblies after memorization of the scheduling of said means and controlling their exit to the loading lines (link e), d) a main computer containing, as known per se, several units, including a data input unit, a unit for memorization of several files, a digital control unit carrying out several processing operations and an output unit, said computer making possible:

the capture of data on the entrance and exit movements of the storage means (link f), the processing of said data, as well as data processing transfers from the manufacturer(s) verifying them, modifying them and scheduling them (link b), the memorization of said manufacturing data and data on availabilities of the storage means, as well as those on establishment of the rotating stock, the establishment and transmission of the filling card of the delivery units (link c), the processing, organization and initiation of the necessary production (links h, k), the scheduling of the storage means, and the transfer to the robots managing loading and managing storage means (link g).

The production and delivery line advantageously comprises, in addition and after the tire inflation means, a machine for placement of heels, making it possible, by application of a pressure on the sidewalls of the tire inflated to a given pressure, to displace the heels and reposition them under the effect of the internal inflation pressure.

DESCRIPTION OF THE DRAWINGS

The characteristics and advantages of the invention will be best understood by means of the description which follows and FIGS. 1 and 2 referring thereto, showing the different stages of the process as well as the means intended for the correct development of said stages.

DESCRIPTION OF PREFERRED EMBODIMENTS

Figure 1:
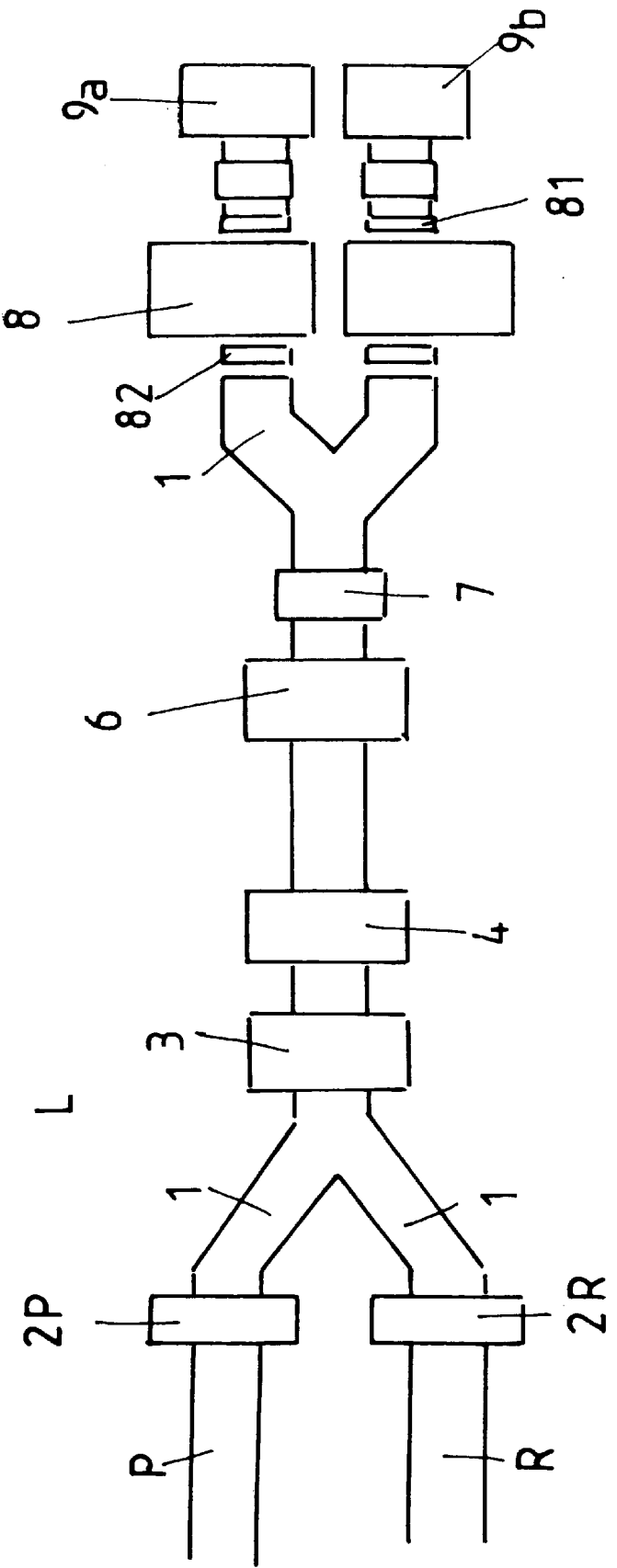
Figure 2:
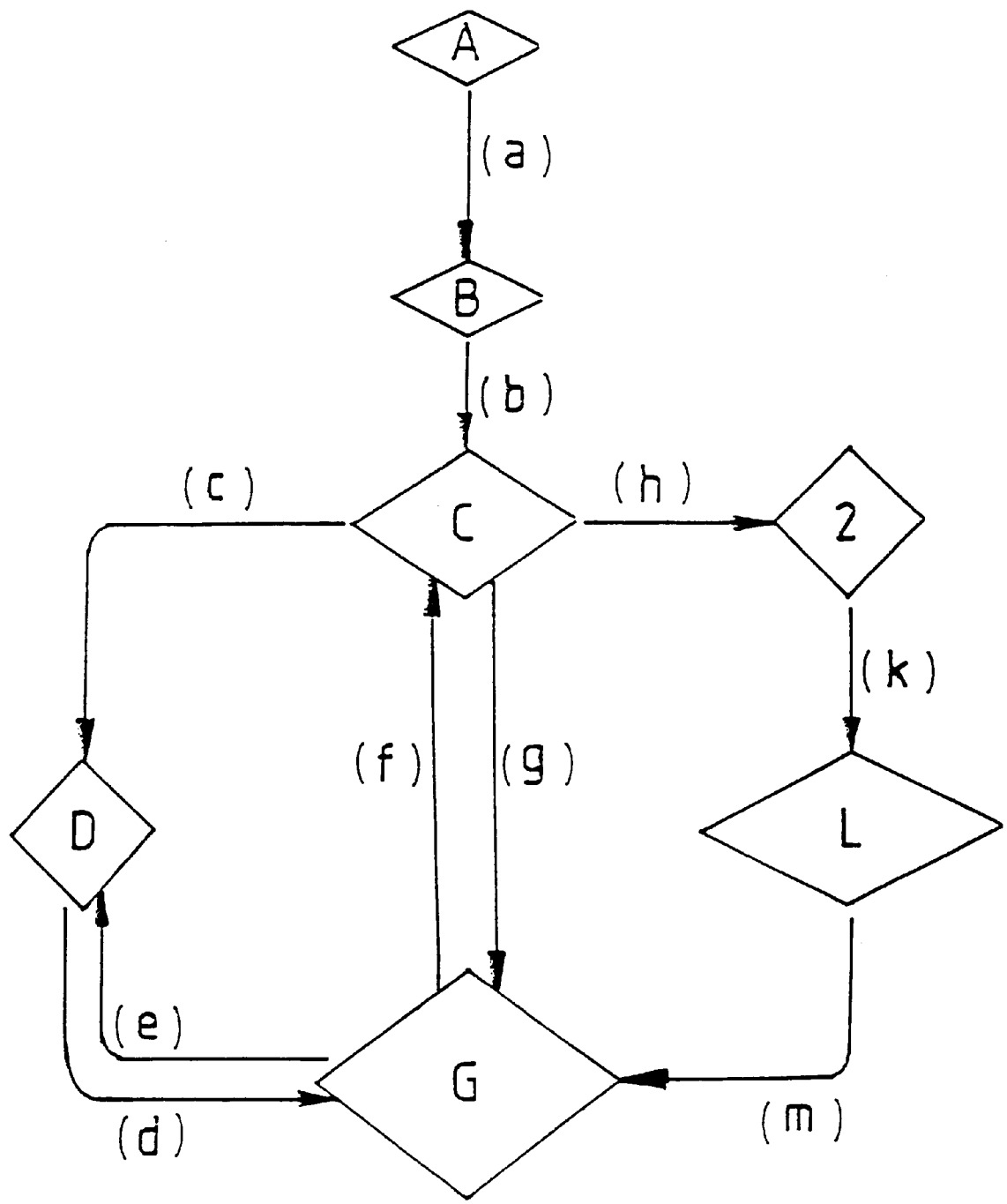

A modem link (a) to the vehicle manufacturer's main computer A makes it possible to create on a low power computer B a data file concerning the vehicle bodies at the time of their arrival on the assembly line, those data concerning the date and time of arrival of the body on the line, the alignment number of the vehicle, the badge of said vehicle, and the manufacturer's reference of the mounted assemblies for that vehicle and according to the two types: main wheels R1 and spare wheel R2. Said information, relating to each vehicle to be assembled, can concern and generally does concern several assembly lines and different types of vehicles on the same line.

When transferred (link b) to a main computer C, said data, with the aid of appropriate software used on said computer C, are first verified: it is verified, for example, that the orders coming from the manufacturer are indeed in chronological order, that the match between the manufacturer's mounted assembly references and the type of vehicle is correct, that the alignment numbers of the vehicle are in ascending order, and that the computer number assigned to each vehicle corresponds to the five mounted assemblies: the four main assemblies and the spare assembly. The data are then modified to match the references of the mounted assembly supplier and scheduled; the manufacturer's total orders are separated into orders for each assembly line and into orders for the right and left sides, respectively, and the spare wheel of the vehicle, in the order of alignment of the vehicles on the manufacture's line.

The information is then classified by packages of 80 mounted assemblies, that is, for the equipment of 16 vehicles with 64 main assemblies and 16 spare assemblies, said 64 assemblies having to be distributed for delivery to the manufacturer in 32 assemblies placed in a first delivery unit or container for the left side of the manufacture's assembly line, and 32 assemblies placed in a second container for the right side, one of the two containers also taking the 16 spare wheels.

The requirements being perfectly defined by type of assembly, quantity, scheduling and time, the main computer is connected (link c) by a first industrial network to the programmable robot D of the loading lines 81 of the delivery units or containers 9, in order to transmit to them the card of the 80 mounted assemblies corresponding to the delivery following the loading in progress; card is understood to mean the essential law or plan of filling of the two containers 9, a law containing all the useful information on loading and scrupulously respecting the manufacture's data on the need for assemblies matching the order of passage on the vehicle assembly line.

The robot D of the loading lines then queries (link d) the programmable storage robot G or management robot of the warehouse 8 on the available quantities of references or codes of mounted assemblies necessary for delivery. Said warehouse 8 embraces two functional units or stocks 8a, 8b, each unit containing 96 gravity chutes 80 with roller conveyors (the mounted assemblies E are conveyed by gravity), and each chute can store 12 identical mounted assemblies E. The robot G managing the warehouse answers the robot D of the loading lines positively or negatively, and in case of a positive answer, organizes and uses the passage of the assemblies requested from the warehouse to the loading lines (link e) by means of mobile loading units 81 and following the filling plan of the delivery units 9.

Whatever the answer of the storage robot G, every exit movement from the warehouse 8, relating to a given assembly, is transferred, memorized and processed (link f) by the processing software of the main computer C which, depending on the spaces then available in said warehouse 8, the capacity of said warehouse and the request of the manufacturer(s) delivered in sync for a given product, processes, calculates and organizes the manufacturing runs necessary for the satisfaction of such requests.

The production runs of mounted assemblies can be of three kinds:
  the so-called scheduling runs following a negative answer of the warehouse management robot on availability of the assemblies requested,
  the renewal runs consisting of renewing the assemblies used up and of maintaining a number of assemblies sufficient for the establishment of a so-called "buffer" stock, said stock taking into account the estimates of the number of assemblies necessary for each day of production of vehicles,
  the specific runs, manufacturing runs of products that it is not necessary to delivery in sync and manufacturing runs of products intended for maintaining the number and type of assemblies of a so-called safety or standby stock, which can be used in case of force majeure.

Only the scheduling runs and the so-called renewal runs are managed, in the case described, by a computer system in their entirety. The specific runs and the runs with a view to constant maintenance of the standby stock are not processed in the same way as previously, in the sense that the data necessary for making the desired assemblies are inserted in the system manually.

Whatever the production run might be called, the main system organizes the runs numbering five, depending on the urgency of the requirements, the scheduling runs taking priority over the other two runs and the specific runs being related to the renewal runs.

The assembly manufacturing runs being precisely defined by the codes of the supplier of assemblies, the number and corresponding codes or references of the tires and wheels necessary are transferred by a second network (link h) to the supply warehouse 2 of components, which are the tires P and wheels R, in order to feed (link k) the roller conveyors 1 transporting those products to the mounting device 3 and accessory devices of the assembly line of mounted assemblies E.

Management of the component requirements can be manual, the future production runs being simply displayed electronically in the warehouse 8 of components to the attention of the fork lift truck operators in charge of transporting the pallets of components necessary. It can also be computerized from point of exit from the warehouses of suppliers of components P and R—the tires or wheels can be of any different makes—until delivery at the assembly shop of the supplier of mounted assemblies E, with the possibility of delivery of said components in sync for use of the mounting runs provided for on the assembly line.

Once mounting of the mounted assemblies E is carried out, each assembly, depending on the run to which it belongs, is then transferred either to the standby warehouse where the assemblies are stored on suitable pallets, or to a nonsynchronous delivery warehouse where the assemblies are also stored on pallets, or to the warehouse 8 with gravity chutes 80 (link m), the robot G of which controls operation of the mobile units entering 82 the warehouse in order to place each mounted assembly E in the gravity chute 80 provided for by said robot G, scheduling of the warehouse 8 having been organized by the main computer C and transferred to the robot G (link g). In order to close the loop, all of the information relating to that warehouse entrance are transferred (link f) to the main computer C.

We claim:

1. A production and delivery line of mounted assemblies, each including a tire and its service wheel, comprising means for routing tires and wheels, means for assembling said tires on their wheels, means for placement of heels, making it possible, by application of a pressure on the sidewalls of the tire inflated to a given pressure, to displace the heels and position them under the effect of the internal inflation pressure, means controlling storage of mounted assemblies and the lines and units for delivery of said assemblies, characterized in that, in order to deliver assemblies in sync to at least one vehicle manufacturer, it further includes a computer system comprising:
  a) a computer B making it possible to create and memorize a file of orders from the manufacturer(s) (link a),
  b) a programmable robot D for management of the automatic loading controls of the delivery units according to a memorized cartography, and querying
  c) a programmable robot G for management of the storage means, controlling the entrance and placement of the assemblies after memorization of the scheduling of said means and controlling their exit to the loading lines (link e), d) a main computer C embodying several units, including a data input unit, a unit for memorization for several files, a digital control unit carrying out several processing operations and an output unit, said computer making possible:

the capture of data on the entrance and exit movements of the storage means (link f), the processing of said data, as well as data processing transfers from the manufacturer(s) verifying them, modifying them and scheduling them (link b), the memorization of these manufacturing data and data on availabilities of the storage means, as well as those on establishment of the rotating stock, the establishment and transmission of the filling card of the delivery units (link c), the processing, organization and initiation of the necessary production (links h, k), the scheduling of the storage means, and the transfer to the robots D managing loading and robots G managing storage means (link g).

2. A system of information management by a system of computers and robots dedicated to the production and delivery of tire/wheel assemblies, characterized in that the orders from the manufacturer(s) are transferred (link a) to a file in a standardized format, said recovered data being transmitted to (link b) and verified, separated, sorted, modified and classified in a central processing unit C, in order to be transferred (link c) to the robot D managing the automatic controls of loading of the delivery units, and in order to query the storage warehouse on quality and quantity availabilities of assemblies (link d), the central unit C being informed (link f) of each mounted assembly movement by the robot G managing the automatic storage controls, so as to organize, according to said availabilities, the production of assemblies e necessary, on the one hand, to satisfy delivery in sync, respecting the cartography of the delivery units, to the manufacturer(s) and, on the other, for the establishment of stock adapted to future deliveries (links h and k), the central unit C determining the locations of the storage warehouse intended to receive the assemblies thus manufactured, and transmitting (link g) the data on said locations to the robot G managing the automatic controls of supply of the chutes of said warehouse.

* * * * *

UNITED STATES PATENT AND TRADEMARK OFFICE
CERTIFICATE OF CORRECTION

PATENT NO.    : 6,298,281 B1
DATED         : October 2, 2001
INVENTOR(S)   : Menard et al.

It is certified that error appears in the above-identified patent and that said Letters Patent is hereby corrected as shown below:

<u>Title page,</u>
Item [56], References Cited, OTHER PUBLICATIONS, under Peshek et al., "Advancwed" should read -- Advanced --
Item [75], Inventor(s): "Frederic" should read -- Frédéric --

<u>Column 4,</u>
Line 62, "querying" should read -- querying, --

<u>Column 6,</u>
Line 12, "assemblies e" should read -- assemblies E --

Signed and Sealed this

Twenty-ninth Day of October, 2002

*Attest:*

*Attesting Officer*

JAMES E. ROGAN
*Director of the United States Patent and Trademark Office*